United States Patent
Okamoto

(10) Patent No.: US 10,456,917 B2
(45) Date of Patent: Oct. 29, 2019

(54) ROBOT SYSTEM INCLUDING A PLURALITY OF ROBOTS, ROBOT CONTROLLER AND ROBOT CONTROL METHOD

(71) Applicant: FANUC CORPORATION, Yamanashi (JP)

(72) Inventor: Takahiro Okamoto, Yamanashi (JP)

(73) Assignee: FANUC CORPORARATION, Yamanashi (JP)

( * ) Notice: Subject to any disclaimer, the term of this patent is extended or adjusted under 35 U.S.C. 154(b) by 150 days.

(21) Appl. No.: 15/828,599

(22) Filed: Dec. 1, 2017

(65) Prior Publication Data
US 2018/0161979 A1    Jun. 14, 2018

(30) Foreign Application Priority Data
Dec. 9, 2016    (JP) .................. 2016-239276

(51) Int. Cl.
*B25J 9/16*    (2006.01)
*B25J 3/00*    (2006.01)
*B25J 9/00*    (2006.01)

(52) U.S. Cl.
CPC .............. *B25J 9/1669* (2013.01); *B25J 3/00* (2013.01); *B25J 9/0084* (2013.01); *B25J 9/1612* (2013.01); *B25J 9/1664* (2013.01); *B25J 9/1682* (2013.01)

(58) Field of Classification Search
CPC ...... B25J 9/1669; B25J 9/1682; B25J 9/1664; B25J 3/00; B25J 9/0084; B25J 9/1612
USPC ........................................................ 700/245
See application file for complete search history.

(56) References Cited

U.S. PATENT DOCUMENTS

| | | | | |
|---|---|---|---|---|
| 4,495,588 A | * | 1/1985 | Nio | B25J 9/161 318/568.2 |
| 5,889,924 A | * | 3/1999 | Okabayashi | B25J 9/1682 700/245 |
| 9,517,556 B2 | * | 12/2016 | Shiratsuchi | B25J 9/1682 |
| 2004/0199290 A1 | * | 10/2004 | Stoddard | B25J 9/1669 700/248 |
| 2006/0069466 A1 | * | 3/2006 | Kato | B25J 9/1682 700/264 |

(Continued)

FOREIGN PATENT DOCUMENTS

JP    H1-188903 A    7/1989
JP    H7-20915 A    1/1995

(Continued)

*Primary Examiner* — Jaime Figueroa
(74) *Attorney, Agent, or Firm* — Hauptman Ham, LLP

(57) ABSTRACT

A robot system, a robot controller and a robot control method, by which a coordinated control of a plurality of robots can be taught while appropriately considering a positional deviation of each robot into consideration. A gripping misalignment of a first workpiece in a leading robot is detected, and then a first amount of correction for correcting the misalignment is calculated. Further, a gripping misalignment of a second workpiece in a following robot is detected, and then a second amount of correction for correcting the misalignment is calculated. In the coordinated control, a taught position/orientation of the leading robot is corrected based on the first amount of correction, and a taught position/orientation of the following robot is corrected based on both the first mount of correction and the second amount of correction.

3 Claims, 3 Drawing Sheets

(56) References Cited

U.S. PATENT DOCUMENTS

| | | | | |
|---|---|---|---|---|
| 2006/0145647 A1* | 7/2006 | Kitatsuji | ................ | B25J 9/1682 318/568.11 |
| 2006/0287769 A1* | 12/2006 | Yanagita | ................ | B25J 9/1669 700/245 |
| 2007/0150093 A1* | 6/2007 | Nagatsuka | ............ | B25J 9/1682 700/235 |
| 2009/0025199 A1* | 1/2009 | Hariki | .................... | B25J 9/1682 29/430 |
| 2011/0245971 A1* | 10/2011 | Sarh | ....................... | B25J 9/1682 700/248 |
| 2012/0116585 A1* | 5/2012 | Yoshima | ............. | B23K 9/1062 700/248 |
| 2012/0191245 A1* | 7/2012 | Fudaba | ...................... | B25J 3/04 700/254 |
| 2013/0120547 A1* | 5/2013 | Linnell | ................... | G06T 13/40 348/61 |
| 2014/0277714 A1* | 9/2014 | Izumi | ..................... | B25J 9/0084 700/248 |
| 2014/0277715 A1* | 9/2014 | Nagai | .................... | B25J 9/0084 700/248 |
| 2015/0148952 A1* | 5/2015 | Shiratsuchi | ............ | B25J 9/1682 700/248 |
| 2016/0023355 A1* | 1/2016 | Komatsu | ............... | B25J 9/1682 700/248 |
| 2018/0243897 A1* | 8/2018 | Hashimoto | ............. | B23P 19/04 |
| 2018/0345492 A1* | 12/2018 | Watanabe | ............. | G05B 19/42 |

FOREIGN PATENT DOCUMENTS

| | | |
|---|---|---|
| JP | 09-207088 A | 8/1997 |
| JP | 2004-114161 A | 4/2004 |
| JP | 2004-249391 A | 9/2004 |
| JP | 2005-262369 A | 9/2005 |
| JP | 2006-99474 A | 4/2006 |
| JP | 2010-274396 A | 12/2010 |
| JP | 2011-104720 A | 6/2011 |
| JP | 2011-230243 A | 11/2011 |
| WO | 2011/096185 A1 | 8/2011 |

* cited by examiner

ROBOT SYSTEM INCLUDING A PLURALITY OF ROBOTS, ROBOT CONTROLLER AND ROBOT CONTROL METHOD

RELATED APPLICATIONS

The present application claims priority to Japanese Application Number 2016-239276, filed Dec. 9, 2016, the disclosure of which is hereby incorporated by reference herein in its entirety.

BACKGROUND OF THE INVENTION

1. Field of the Invention

The present invention relates to a robot system including a plurality of robots, a robot controller in the robot system, and a method for controlling the robots.

2. Description of the Related Art

When a plurality of robots are to be used in a production line, etc., a coordinated control may be carried out, in which the position/orientation of a following robot having a work tool is controlled corresponding to the motion of a leading robot gripping a workpiece. In the coordinated control, based on a coordinate system fixed to or set for a final axis of the leading robot, a user may teach the relative position and velocity of the following robot.

In a collaborative operation using a plurality of robots, it may be necessary to detect and correct a positional deviation between the robots in order to accurately carry out an operation. As a relevant prior art document, JP 2010-274396 A discloses a technique for detecting and correcting a positional deviation generated in coordinated control between a positioning robot and an operation robot, by using an inertia sensor.

JP H09-207088 A discloses: a setting method for easily calculating a coordinate conversion matrix which is necessary to carry out collaborative motion of a plurality of robots; and a correcting method for correcting an error generated when converting the matrix.

JP 2004-114161 A discloses a controller of a dual-arm robot, by which a relative error generated in collaborative motion of the dual-arm robot is limited, and the collaborative motion is rapidly and correctly carried out.

Further, JP 2004-249391 A discloses a workpiece conveying device having no dedicated conveyor, configured to monitor a state of a workpiece gripped by a robot hand without stopping the robot. This document also discloses: a means for previously storing a predetermined gripping state of the workpiece by the robot hand; a means for comparing the predetermined gripping state and a gripping state detected by a vision sensor so as to calculate an error therebetween; and a means for correcting the position of a place to which the workpiece should be conveyed by the robot, based on the error.

In a system including a plurality of robots, the coordinated control may be carried out, in which, for example, two robots are independently operated so as to grip respective workpieces, and then the two robots are cooperatively operated while maintaining a relative position and orientation between the two workpieces. In this regard, when a positional deviation of each robot is independently corrected, the positional relationship between the two robots may be changed after the correction in the coordinated control. For example, in case that each robot independently corrects a gripping misalignment generated when each robot grips the respective workpiece, the previously taught positional relationship between the workpieces may be changed when the coordinated control is started.

SUMMARY OF THE INVENTION

One aspect of the present disclosure provides a robot system including a leading robot and a following robot, the robot system being configured to teach coordinated control in which the following robot is operated while following a motion of the leading robot, the robot system comprising: a first detecting section configured to detect a first deviation of a taught position/orientation of the leading robot relative to a predetermined first position/orientation; a first correcting section configured to correct the position/orientation of the leading robot based on the first deviation; a second detecting section configured to detect a second deviation of a taught position/orientation of the following robot relative to a predetermined second position/orientation; and a second correcting section configured to correct the position/orientation of the following robot based on at least the second deviation, wherein the second correcting section is configured to correct the position/orientation of the following robot based on both the first deviation and the second deviation, when the coordinated control is carried out.

Another aspect of the present disclosure provides a robot controller included in a robot system including a leading robot and a following robot, the robot system being configured to teach coordinated control in which the following robot is operated while following a motion of the leading robot, the robot controller comprising: a first correcting section configured to correct a position/orientation of the leading robot based on a first deviation of a taught position/orientation of the leading robot relative to a predetermined first position/orientation; and a second correcting section configured to correct a position/orientation of the following robot based on at least the second deviation of a taught position/orientation of the following robot relative to a predetermined second position/orientation, wherein the second correcting section is configured to correct the position/orientation of the following robot based on both the first deviation and the second deviation, when the coordinated control is carried out.

Still another aspect of the present disclosure provides a control method for a robot system including a leading robot and a following robot, the robot system being configured to teach coordinated control in which the following robot is operated while following a motion of the leading robot, the control method comprising the steps of: detecting a first deviation of a taught position/orientation of the leading robot relative to a predetermined first position/orientation; correcting the position/orientation of the leading robot based on the first deviation; detecting a second deviation of a taught position/orientation of the following robot relative to a predetermined second position/orientation; and correcting, when the coordinated control is carried out, the position/orientation of the following robot based on both the first deviation and the second deviation.

BRIEF DESCRIPTION OF THE DRAWINGS

The above and other objects, features and advantages of the present invention will be made more apparent by the following description of the preferred embodiments thereof, with reference to the accompanying drawings, wherein.

DETAILED DESCRIPTIONS

Figure 1:
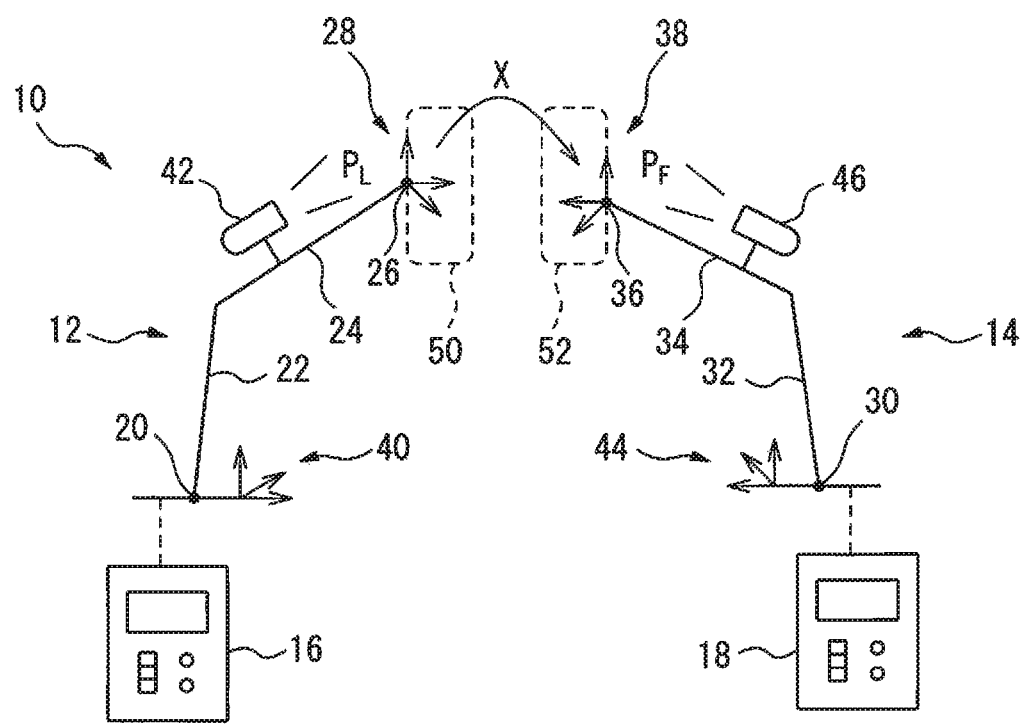
FIG. 1 is a view showing a schematic configuration of a robot system according to a preferred embodiment of the present disclosure.

FIG. 1 shows a schematic configuration of a robot system according to a preferred embodiment of the present disclosure, for carrying out coordinated control by using a plurality of (in the drawing, two) robots. System 10 includes a leading (first) robot 12 and a following (second) robot 14, and is configured to carry out the coordinated control in which following robot 14 is operated while following the motion of leading robot 12. The motion of leading robot 12 may be controlled by a first robot controller 16, and the motion of following robot 14 may be controlled by a second robot controller 18. Although FIG. 1 shows that first robot controller 16 and second robot controller 18 are separated from each other, a substantially one controller may control both leading robot 12 and following robot 14.

Leading robot 12 has at least one drive axis. For example, leading robot 12 may be a six-axis articulated robot having a rotating body 20 rotatable about a generally vertical axis, an upper arm 22 rotatably attached to rotating body 20, a forearm 24 rotatably attached to upper arm 22, and a wrist axis 26 rotatably attached to a front end of forearm 24. By rotating each axis of leading robot 12, the position of a front end of leading robot 12 may be moved and controlled. In the embodiment, wrist axis 26 corresponds to a final axis (or an end axis), and a first tool coordinate system 28 is defined with respect to the final axis.

Following robot 14 has at least one drive axis. For example, following robot 14 may be a six-axis articulated robot having a rotating body 30 rotatable about a generally vertical axis, an upper arm 32 rotatably attached to rotating body 30, a forearm 34 rotatably attached to upper arm 32, and a wrist axis 36 rotatably attached to a front end of forearm 34. By rotating each axis of following robot 14, the position of a front end of following robot 14 may be moved and controlled. In the embodiment, wrist axis 36 corresponds to a final axis (or an end axis), and a second tool coordinate system 38 is defined with respect to the final axis. In addition, the tool coordinate axis may be referred to as a hand coordinate system.

Robot system 10 has a first detecting section 42 configured to detect a first deviation of a taught position/orientation of leading robot 12 relative to a predetermined first position/orientation, based on a first reference coordinate system (base coordinate system) 40 fixed to or defined with respect to leading robot 12. For example, first detecting section 42 has a two-dimensional or three-dimensional camera attached to forearm 24 of leading robot 12, and the first deviation can be quantitatively calculated by image processing of a result of capture (e.g., a captured image) of the camera. In this regard, first detecting section 42 may have any means such as a sensor or a camera arranged at a fixed position, etc., as long as the means can detect the first deviation. Robot system 10 also has a first correcting section configured to correct the position/orientation of leading robot 12 based on the detected first deviation. For example, the first correcting section may be contained in first robot controller 16 as a CPU, etc. Alternatively, the first correcting section may be another device such as a personal computer, which is separated from the robot controller.

Robot system 10 has a second detecting section 46 configured to detect a second deviation of a taught position/orientation of following robot 14 relative to a predetermined second position/orientation, based on a second reference coordinate system (base coordinate system) 44 fixed to or defined with respect to following robot 14. For example, second detecting section 46 has a two-dimensional or three-dimensional camera attached to forearm 34 of following robot 14, and the second deviation can be quantitatively calculated by image processing of a result of capture (e.g., a captured image) of the camera. In this regard, second detecting section 46 may have any means such as a sensor or a camera arranged at a fixed position, etc., as long as the means can detect the second deviation. Robot system 10 also has a second correcting section configured to correct the position/orientation of following robot 14 based on the detected second deviation. For example, the second correcting section may be contained in second robot controller 18 as a CPU, etc. Alternatively, the second correcting section may be another device such as a personal computer, which is separated from the robot controller.

In the present disclosure, the term "position/orientation" means the position and orientation of (a representative point such as a tool center point of) the robot. However, when it is not necessary to consider the orientation of the robot in order to correct the above first or second deviation, the term "position/orientation" may mean the position only. On the other hand, when it is not necessary to consider the position of the robot in order to correct the above first or second deviation, the term "position/orientation" may mean the orientation only.

When the coordinated control between leading robot 12 and following robot 14 is not carried out, the second correcting section is capable of correcting the position/orientation of following robot 14 based on the second deviation only. On the other hand, when the coordinated control is carried out, the second correcting section corrects the position/orientation of following robot 14 based on both the first deviation and the second deviation. Hereinafter, a detail thereof will be explained with reference to FIGS. 2 and 3.

In this example, as shown in FIG. 1, a teaching operation is carried out so that the motion of leading robot 12 for holding a first workpiece 50 and moving to a first position PL, and the motion of following robot 14 for holding a second workpiece 52 and moving to a second position PF, are independently carried out, and then, the coordinated control is carried out in which the robots moves to the next position while maintaining the relative position/orientation between the first and second workpieces. In this regard, the expression "hold(ing)" may mean gripping by a grip-type hand, and also may mean magnetic or vacuum adsorption. In addition, the expression "maintaining the relative position/orientation between the workpieces," etc., may mean that one of the workpieces is held so that one workpiece is not moved relative to the other workpiece while the workpieces contact each other. Alternatively, the expression may mean that one of the workpieces is held so that one workpiece is not moved (i.e., the position/orientation of one workpiece is not changed) relative to the other workpiece while the workpieces are separated from each other.

Figure 2:
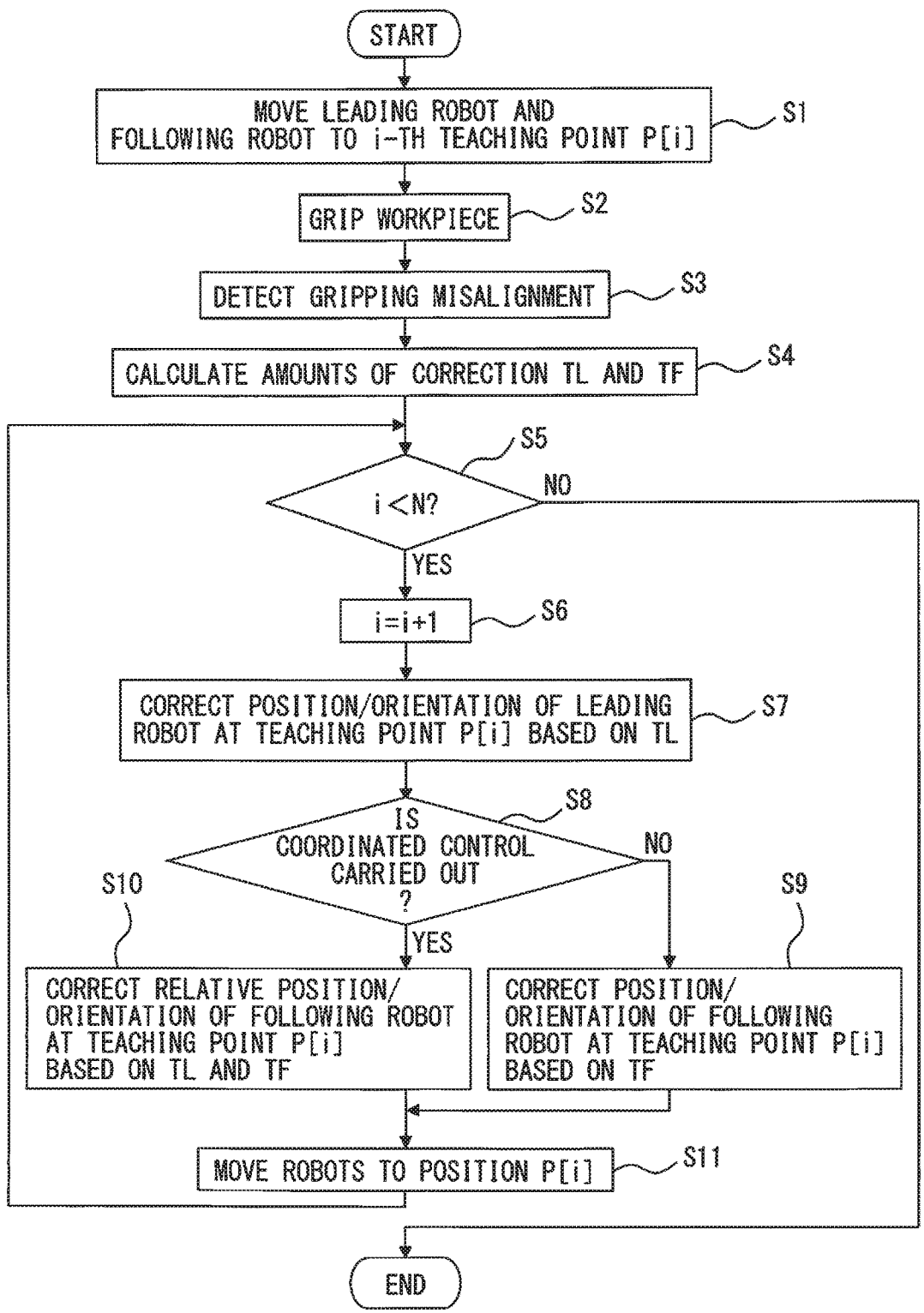
FIG. 2 is a flowchart showing an example of a procedure in the robot system of FIG. 1.

FIG. 2 is a flowchart showing an example of a procedure (or a robot control method) including the coordinated control in robot system 10. First, leading robot 12 and following robot 14 are moved to an i-th teaching point P[i] (step S1), and then, leading robot 12 grips first workpiece 50 and following robot 14 grips second workpiece 52 (step S2). In this regard, teaching point P[i] may be generated or taught by an input of a user into each controller, etc. Alternatively, teaching point P[i] may be automatically generated or taught by each controller after the controller reads a predetermined robot program, etc.

In the embodiment, it is assumed that the position/orientation of following robot 14 in the coordinated control is taught with respect to first tool coordinate system 28 fixed (defined) to the final axis (or end axis) of leading robot 12. In this case, a teaching point (position) X of following robot 14 can be calculated from equation (1) as described below. For example, each of positions X, PL and Pf may be represented by a homogeneous conversion matrix having four rows and four columns. Further, a character "Inv" in equation (1) represents an inversion matrix.

$$X = Inv(PL) \cdot PF \quad (1)$$

Figure 3:
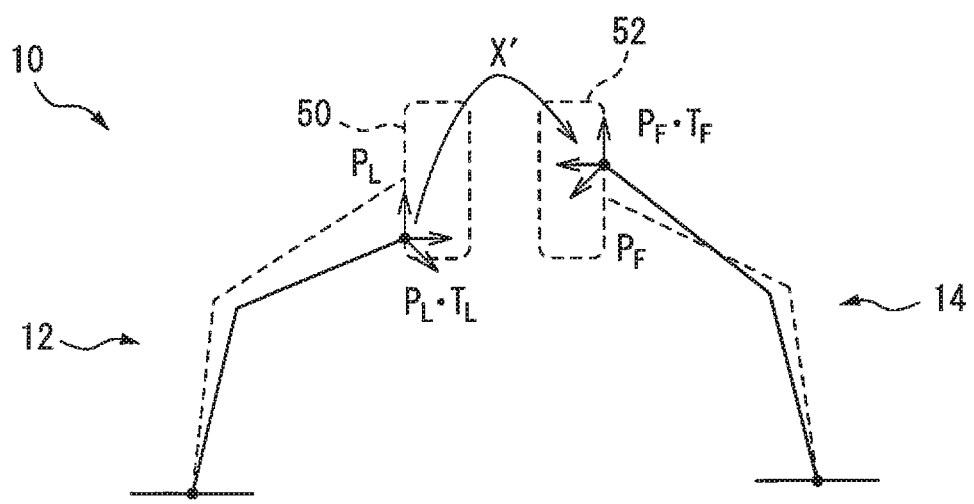
FIG. 3 is a view explaining an example in which a position/orientation of a robot is corrected corresponding to a gripping misalignment of a workpiece, in the robot system of FIG. 1.

Next, a first deviation (in the embodiment, a gripping misalignment of first workpiece 50) of leading robot 12 is detected by using first detecting section 42, and a second deviation (in the embodiment, a gripping misalignment of second workpiece 52) of following robot 14 is detected by using second detecting section 46 (step S3). At this point, as shown in FIG. 3, it is assumed that, in at least one of (in the example of FIG. 3, both) leading robot 12 and following robot 14, a gripping misalignment occurs between the robot and the workpiece gripped by the robot. In such a case, the first gripping misalignment of first workpiece 50 gripped by leading robot 12 is detected by first detecting section 42, and a first amount of correction TL for correcting the first gripping misalignment is calculated. Similarly, the second gripping misalignment of second workpiece 52 gripped by following robot 14 is detected by second detecting section 46, and a second amount of correction TF for correcting the second gripping misalignment is calculated (step S4).

Next, the position/orientation of leading robot 12 at teaching point P[i] is corrected by using amount of correction TL obtained in step S4 (step S7). Then, with respect to following robot 14, it is judged as to whether or not the teaching operation at teaching point P[i] is an object of the coordinated control (step S8). When the teaching operation at teaching point P[i] is not the object of the coordinated control, the position/orientation of following robot 14 at teaching point P[i] is corrected by using amount of correction TF obtained in step S4 (step S9). On the other hand, when the teaching operation at teaching point P[i] is the object of the coordinated control, the position/orientation of following robot 14 at teaching point P[i] is corrected by using amounts of correction TL and TF obtained in step S4 (step S10). In other words, when the coordinated control is carried out, the position/orientation of following robot 14 relative to (tool coordinate system 28 of) leading robot 12 is corrected by using both amounts of correction TL and TF.

Concretely, the position/orientation of leading robot 12 after being corrected by amount of correction TL can be represented as (PL·TL), and the position/orientation of following robot 14 after being corrected by amount of correction TF can be represented as (PF·TF). Therefore, a teaching point X' of following robot 14 in step S10 can be calculated by equation (2) as described below. For example, amounts of correction TL and TF may be represented by a homogeneous conversion matrix having four rows and four columns.

$$X = Inv(TL) \cdot X \cdot TF \quad (2)$$
$$= Inv(PL \cdot TL) \cdot (PF \cdot TF)$$

Finally, in step S11, each robot is moved to corrected teaching point P[i] (i.e., the position taking the gripping misalignment). The procedure of steps S7 to S11 is repeated until the parameter "i" reaches a predetermined number of teaching points "N" (steps S5 and S6).

As shown in FIG. 1, when the target position of following robot 14 is taught based on tool coordinate system 28 fixed to the final axis (in this case, wrist axis 26) of leading robot 12, the amount of correction based on the gripping misalignment is unknown at the time of teaching. Therefore, in the prior art, it is difficult for the user to generate a teaching point while previously taking the gripping misalignment into consideration. On the other hand, in the present embodiment, the teaching point of following robot 14 can be corrected or modified in view of the amounts of correction of the both robots, whereby the relationship between the workpieces in the coordinated control, after the gripping misalignment is corrected, can be maintained as the same relationship as in the teaching operation.

In the prior art, when a leading robot and a following robot are configured to independently detect and correct respective gripping misalignments, the robots can be move the respective gripped workpieces so as to form a predetermined state (e.g., a surface matching state) without inconvenience. However, after that, when the coordinated control of the robots is carried out while maintaining the surface matching state (or the positional relationship) of the workpieces, the following robot may not correctly follow the motion of the leading robot, since the gripping misalignment of the leading robot is not considered in controlling the motion of the following robot. Accordingly, the positional relationship between the robots may be changed, whereby a problem may occur (e.g., an excess force is applied to the workpiece and the workpiece is damaged by the force).

On the other hand, in the present embodiment, during the coordinated control is carried out, the position/orientation (or the teaching point) of following robot 14 relative to leading robot 12 can be corrected by considering both the gripping misalignment of following robot 14 and the gripping misalignment of leading robot 12, if any. Therefore, even when executing the coordinated control, following robot 14 can follow the motion of leading robot 12 while precisely maintaining the surface matching state, etc.

In the above embodiment, leading robot 12 and following robot 14 grip respective different workpieces. However, in the coordinated control, the present invention can be applied to a case that leading robot 12 and following robot 14 cooperatively convey one workpiece while the robots grip respective different portions of the workpiece, or a case that one of leading robot 12 and following robot 14 grips a workpiece (to be processed) and the other robot grips a work tool such as a polishing tool, and then the workpiece is processed by the work tool, etc. In any of the cases, the positional relationship between the workpieces or the robots can be appropriately maintained by correcting the motion of the following robot based on both the deviations of the position/orientation of the both robots. Therefore, it can be prevented that the excess force is applied to the workpiece, and/or that the portion of the workpiece to be processed is deviated from a desired position.

According to the present disclosure, the position/orientation of the following robot can be corrected based on both the first deviation of the leading robot and the second deviation of the following robot. Therefore, even in the coordinated control, in which an amount of correction which is unknown at the time of teaching should be considered, the teaching operation can be easily and precisely carried out.

While the invention has been described with reference to specific embodiments, it will be understood, by those skilled in the art, that various changes or modifications may be made thereto without departing from the scope of the following claims.

The invention claimed is:

1. A robot system including a leading robot and a following robot, the robot system being configured to teach coordinated control in which the leading robot gripping a first workpiece and the following robot gripping a second workpiece are independently moved to a predetermined position, and then, the following robot is operated while following a motion of the leading robot and while maintaining a relative position/orientation between the first and second workpieces, the robot system comprising:
    a first detecting section configured to detect a first gripping misalignment of a taught position/orientation of the leading robot relative to a predetermined first position/orientation;
    a first correcting section configured to correct the position/orientation of the leading robot based on the first gripping misalignment;
    a second detecting section configured to detect a second gripping misalignment of a taught position/orientation of the following robot relative to a predetermined second position/orientation; and
    a second correcting section configured to correct the position/orientation of the following robot based on at least the second gripping misalignment,
    wherein, when the coordinated control is carried out, a teaching point of the following robot is calculated based on both the position/orientation of the leading robot corrected by the first correcting section and the position/orientation of the following robot corrected by the second correcting section.

2. A robot controller included in a robot system including a leading robot and a following robot, the robot system being configured to teach coordinated control in which the leading robot gripping a first workpiece and the following robot gripping a second workpiece are independently moved to a predetermined position, and then, the following robot is operated while following a motion of the leading robot and while maintaining a relative position/orientation between the first and second workpieces, the robot controller comprising:
    a first correcting section configured to correct a position/orientation of the leading robot based on a first gripping misalignment of a taught position/orientation of the leading robot relative to a predetermined first position/orientation; and
    a second correcting section configured to correct a position/orientation of the following robot based on at least the second gripping misalignment of a taught position/orientation of the following robot relative to a predetermined second position/orientation,
    wherein, when the coordinated control is carried out, a teaching point of the following robot is calculated based on both the position/orientation of the leading robot corrected by the first correcting section and the position/orientation of the following robot corrected by the second correcting section.

3. A control method for a robot system including a leading robot and a following robot, the robot system being configured to teach coordinated control in which the leading robot gripping a first workpiece and the following robot gripping a second workpiece are independently moved to a predetermined position, and then, the following robot is operated while following a motion of the leading robot and while maintaining a relative position/orientation between the first and second workpieces, the control method comprising the steps of:
    detecting a first gripping misalignment of a taught position/orientation of the leading robot relative to a predetermined first position/orientation;
    correcting the position/orientation of the leading robot based on the first gripping misalignment;
    detecting a second gripping misalignment of a taught position/orientation of the following robot relative to a predetermined second position/orientation;
    correcting the position/orientation of the following robot based on the second gripping misalignment; and
    calculating, when the coordinated control is carried out, a teaching point of the following robot based on both the corrected position/orientation of the leading robot and the corrected position/orientation of the following robot.

* * * * *